June 8, 1926.
M. O. SNEDIKER
HUMIDITY CONTROL APPARATUS
Filed Jan. 22, 1926
1,587,560
2 Sheets-Sheet 1
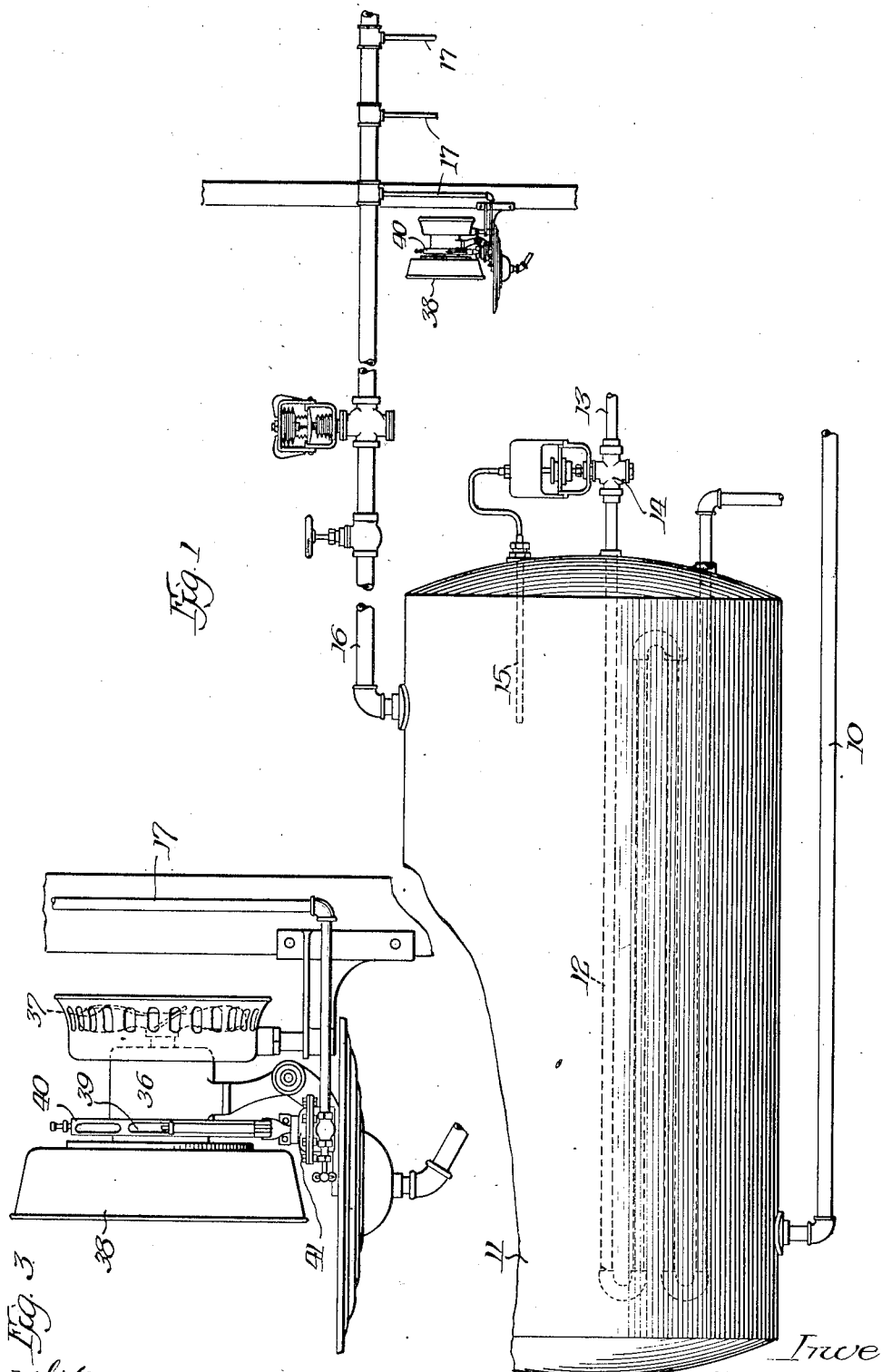

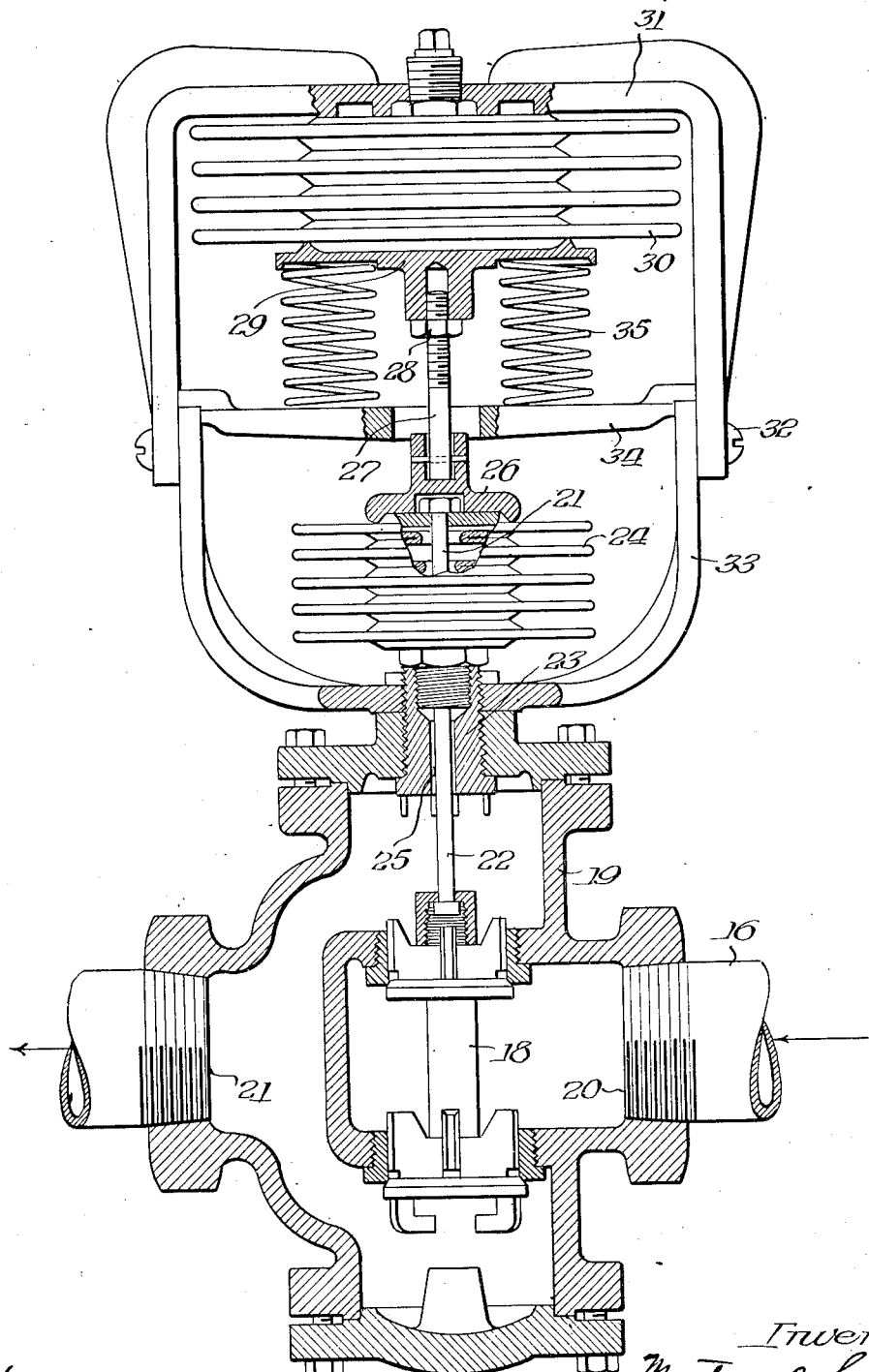

Patented June 8, 1926.

1,587,560

UNITED STATES PATENT OFFICE.

MORTON O. SNEDIKER, OF CHICAGO, ILLINOIS, ASSIGNOR TO POWERS REGULATOR COMPANY, OF CHICAGO, ILLINOIS, A CORPORATION OF ILLINOIS.

HUMIDITY-CONTROL APPARATUS.

Application filed January 22, 1926. Serial No. 83,025.

My invention relates to humidity control apparatus, and particularly to simply constructed means adapted to maintain a constant moisture content of the air in a space notwithstanding temperature changes therein.

It has been found to be desirable, if not essential, in certain industrial operations, particularly in the manufacture of fabrics, to maintain a definite and relatively high moisture content of the surrounding air. This has heretofore been accomplished either by hand-controlled apparatus, the results from the operation of which are uncertain and unreliable, or by the use of complicated and expensive automatically operated devices. In view of the fact that relative humidity fluctuates with the temperature and the further fact that the quantity of moisture discharged into the air is dependent on the supply pressure of the water, a constant relative humidity is almost impossible of attainment by hand controlled apparatus.

In the apparatus of my invention, I have correlated the temperature and pressure and utilized the forces thereof for effecting the desired control.

Where moisture is, as in the case under consideration, discharged directly into the air in the form of mist or atomized liquid, it is obvious that to maintain a constant relative humidity, the quantity of water discharged and atomized must be greater at higher temperatures and vice versa.

I have, therefore, provided a thermostatically controlled pressure regulating valve which automatically changes the quantity of water discharged into the air according to the temperature variations of that air so that a constant relative humidity is maintained. It is furthermore desirable, in order to maintain the humidity within close limits, that the temperature of the water supplied be constant; this for the reason that the ease with which water is taken up by the air is largely dependent upon the heat condition of the water.

The mechanism so described will serve to maintain a constant relative humidity except under certain conditions where the demand for moisture is greatly increased or diminished according to the introduction of large or small quantities of moisture absorbing materials into the space to be regulated. This frequency occurs in cotton mills where the quantity of cotton passing through the room varies from time to time. In order to meet this condition, I employ an additional regulating element consisting of means associated with the water-discharging or atomizing device for varying the discharge capacity in accordance with the moisture content of the air; in other words, the discharge device is subjected to hygrostatic control.

This last named mechanism alone should, in theory, provide the requisite regulation for maintaining a constant relative humidity, but in practice it is found that the capacity of such moisture discharging devices is limited and is not fully responsive to conditions arising out of wide variation in temperature of the space.

In order to secure results that are at all practical it is necessary to utilize a relatively large number of the atomizing devices or mist heads which are very expensive. By my system the number of such devices required is materially reduced.

Under conditions in which there is but slight variation in the quantity of material passing through the space to be regulated, a relative humidity may be maintained within sufficiently close limits without hygrostatic control for the water discharging devices and my invention contemplates such practice.

The apparatus of my invention in its preferred form is of relative simplicity. It consists of means for maintaining a supply of water at a pressure substantially above the highest pressure that will at any time be required at the mist nozzles, together with means in the supply line for maintaining the water at a constant discharge temperature. The water is preferably supplied through a plurality of moist nozzles or similar atomizing devices, provided with hygrostatic control. Interposed in the supply line is a valve, the operation of which is controlled by two opposing forces. One force is that exerted by a vapor thermostat tending to open the valve, and the other force is that of a device operated by the pressure of the water on the discharge side of the valve and tending to close the said valve. In effect the apparatus is a pressure regulating valve, the adjustment of which is automatically controlled by a thermostat that is affected by the temperature of the space to be humidified.

The invention will be more readily understood by reference to the accompanying drawings, in which;

Fig. 1 is a diagrammatic view illustrating the regulating system in a simple form;

Fig. 2 is a sectional view through the regulator by means of which the quantity of discharged water is controlled; and Fig. 3 is a side elevation of a water discharging device provided with a hygrostatic control.

The simple elements of my invention comprise a water supply pipe, 10, connected to a suitable source of supply, in which a pressure is maintained that exceeds that of any pressure that will be required at the discharge nozzle. The water is supplied to a tank, 11, in which steam coils, 12, are mounted. The steam is supplied through pipe, 13, a regulating valve, 14, being interposed in the line. A thermostatic element, 15, is mounted in the tank and serves to position the valve so as to maintain a constant temperature within the tank. The water is discharged from the tank through the pipe, 16, and delivered into the space that is to be humidified through the humidifiers, one of which is shown in Fig. 3, the supply of water to which is through the pipe, 17.

Control of the supply of water to the humidifiers is effected by means of the apparatus disclosed in Fig. 2. It comprises a balance valve, 18, mounted in a casing, 19, having an inlet, 20 and an outlet, 21. The valve stem, 22, passes upward through a nut, 23, and axially through an expansible bellows, 24. A space, 25, is provided around the stem in order to admit water from the discharge side of the valve into the bellows, 24.

A cap, 26, surmounts the bellows, 24, and provides a seat for a connecting stem, 27, the upper end of which is threaded and is engaged by a nut, 28. This is provided for facilitating assembly and initial positioning of the valve. The threaded end of the stem 27, is mounted in a piston 29, that bears against a bellows, 20, adapted to contain a thermostatic liquid having a boiling point lower than the lowest temperature that will be encountered in the space to be humidified. A yoke, 31, surrounds the bellows and is secured by means of the screws, 32, to a complementary yoke, 33. A bridge plate, 34, extends between the yokes and serves as a support for the extension springs, 35, the upper ends of which springs bear against the piston plate 29.

It will be understood that the device shown in Fig. 2 is intended to be located in the room, the humidity of which is to be controlled. However, it may be found desirable to locate the apparatus at some other point and to maintain a thermostatic element in a distant room with a pipe connection to the bellows arrangement indicated at 30.

The humidifier illustrated in Fig. 3 may be of any deisired form. I have preferred to illustrate a well known device, the Bahnson humidifier, the essential elements of which are a motor, 36, a fan, 37, mist cone, 38 and hygrostat. The latter consists of a plurality of non-metallic strips, 39, mounted in end to end relation within an open casing, 40, the action of moisture in the air on the strips causing expansion and contraction thereof with resulting movement of a water control valve within the casing 41. Water supplied through the pipe, 17, is delivered under the control of the hygrostat to the space within the mist cone and under the action of the motor is broken up and delivered in atomized form.

The operation is as follows: Assuming that a supply of water at a constant temperature is in readiness, the water is admitted into the system and passes out through the mist nozzles. As water passes the balanced valve, 18, the pressure on the discharge side of the valve is exerted in the bellows, 24, expanding the same and tending to close the valve. However, the temperature of the room acting on the liquid within the bellows, 30, increases the pressure therein and tends to compress the bellows, 24.

Therefore, it will be seen that there is a definite relation between the areas of the two bellows, 24, 30 based upon capacity of the thermostatic liquid selected. For example: If a liquid such as ethyl chloride is selected a certain known saturated vapor pressure will develop in the bellows, 30, at a certain temperature. Therefore, with a known bellows area, a known thrust will be exerted by the bellows at a given temperature.

The required quantity of water necessary to be discharged into a space in order to maintain a certain relative humidity being known and the pressure of water necessary in order to discharge such required quantity through the mist nozzles being also known, the pressure bellows is designed to provide an area that will, under the said required water pressure, develop a thrust exactly equal to the thrust exerted by the thermostatic bellows. Therefore, having established this ratio for one temperature with the valve partly open, the ratio will remain constant for all temperatures within the range, assuming the use of a valve of sufficient capacity to pass the necessary water.

For example: Assuming an increase of room temperature, a greater pressure will be developed within the thermostatic bellows with a consequent increase in the thrust exerted thereby. This increased thrust overbalances the thrust exerted by the pressure bellows and the valve is opened somewhat. The increased opening, however, results in a greater pressure on the discharge side and the opening movement of the valve is stayed at the point where the discharge pressure exerted through the pressure bellows acts to balance the increased thrust exerted by the thermostatic bellows.

Therefore it will be seen that the relative areas of the opposing bellows must be in accordance with the available or operating forces exerted by the thermostatic liquid and the discharged water; also that a different relative humidity can be obtained by varying the proportions of the two opposing bellows; or, as in the construction shown, by effecting hygrostatic control of the discharge from the mist nozzles.

While in the illustration, the thermostatic bellows is shown to be much larger in diameter than the pressure bellows, it is conceivable that by the selection of a thermostatic liquid that will develop a higher pressure the bellows might be of the same diameter or even of unequal diameters, with the pressure bellows having the greater area. The size is, therefore, seen to be wholly a matter of selection dependent on the thermostatic liquid and the pressure of water required at the mist nozzle in order to discharge specified quantities of water into the space. In this discussion, I have not considered the springs, 35, although it is understood of course, that the force thereof is an element to be considered in determining the effective thrust of the thermostatic bellows.

In the event of a change in the demand for water the hygrostat will respond thereto and vary the setting of the valve 39 that controls the delivery of water to the mist cone. This will occur without reference to temperature conditions. Variations in temperature will result in variations of pressure of water at the humidifier with a proportionate increasing or diminishing quantity delivered. That is to say, while the pressure of water at the humidifier will be in the correct proportion, according to the different temperatures, the delivery of water will be governed by the actual condition of the air as to moisture content. Thus for a given setting of the hygrostat-controlled valve, the delivery of water to the humidifier will vary according to variations of the water pressure as determined by the thermostatically controlled valve.

It will be seen that the quantity of water discharged is controlled by two distinct devices that are interrelated, but unconnected; each functions independently of the other, but each cooperates with the other toward the maintaining of a desired condition. That is to say the hygrostatic control at the atomizing device takes care of the increased or diminished demand for water arising out of natural or unnatural conditions, the operation being dependent upon actual moisture content of the air, whereas the temperature controlled apparatus responds to the theoretical demand for water based on the temperature of the space. Thus it will be seen that while each device operates independently, the action of one influences the action of the other and the two collaborate in the production of a uniform result.

It will be further understood that a thermostatic liquid will be selected in which the pressure increase following the addition of heat is substantially regular and in proportion to a unit pressure at a given temperature and volume. Thus, if a liquid is selected that develops a higher pressure than ethyl chloride, it is assumed that the thrust exerted by the bellows will be increased proportionately for each increase in temperature, in the same proportion as the increase in thrust exerted by the named thermostatic liquid.

Obviously some modifications may be made in the structure shown and I do not wish to be limited except as indicated in the appended claims. Wherever in description and claims the respective bellows are referred to, it will be understood that an equivalent motor is contemplated.

I claim:

1. In means for maintaining a fixed relative humidity within a space, the combination of means for supplying water at a constant temperature, means for discharging water in a finely divided condition into the said space, a valve for controlling the quantity of water discharged, means affected by the heat within the space for exerting a force and effecting a movement of the said valve, and means actuated by the pressure of water after passing the valve for exerting a force that will oppose and balance said heat-developed force and arrest the movement of the valve at a point where the pressure of water on the discharge side of the valve is that required to effect the delivery of a quantity of water equal to that required for a specified humidity within the said space.

2. In means for maintaining a fixed relative humidity within a space, the combination of means for supplying water at a constant temperature, means for discharging water in a finely divided condition into the said space, means affected by the water content of the air within the space for regulating the discharge of said water at the point of discharge, a valve for effecting initial control of the quantity of water discharged, means affected by the heat within the space for exerting a force and effecting a movement of the said valve, and means actuated by the pressure of water after passing the valve for exerting a force that will oppose and balance said heat-developed force and arrest the movement of the valve at a point where the pressure of water on the discharge side of the valve is that required to effect the delivery of a quantity of water to the discharging device equal to that required for a specified humidity within the said space.

3. In means for maintaining a fixed relative humidity within a space, the combination of means for supplying water at a constant temperature, an atomizing device, means affected by the water content of the air within the space for regulating the discharge of water through said atomizing device, a valve for controlling the pressure of water delivered to said atomizing device, means affected by the heat within the space for exerting a force and effecting a movement of said valve and means actuated by the pressure of water after passing the valve for exerting a force that will oppose and balance said heat developed force and arrest the movement of the valve at a point where the pressure of water on the discharge side of the valve is that required at the atomizing device for maintaining a desired relative humidity.

4. In means for maintaining a fixed relative humidity within a space, the combination of means for supplying water at a constant temperature, means for discharging water in an atomized condition into the said space, a thermostatically positioned valve for controlling the pressure of water supplied to said atomizing device, and a hygrostatically controlled device associated with said atomizing device for regulating the discharge of water.

5. In means of the class described, the combination of means for supplying water at a constant temperature, an atomizing device, a valve for controlling the pressure of water supplied to said atomizing device, a thermostat affected by the temperature of the space to be regulated for positioning said valve, a hygrostat affected by the water content of the air within said space for controlling the operation of said atomizing device, the amount of water discharged into said space being dependent upon the action of both said thermostat and said hygrostat.

6. In apparatus of the class described, the combination of means for supplying water at a constant temperature, means for atomizing water into a space, a valve for controlling the pressure of water delivered to said atomizing device, a thermostat acting in opposition to the pressure of water delivered to said atomizing device for positioning said valve and a hygrostat associated with said atomizing device for regulating the quantity of water discharged through said atomizing device.

In testimony whereof I have affixed my signature.

MORTON O. SNEDIKER.